(Model.)
W. LE CONTE STEVENS.
STEREOSCOPE.
No. 262,846.
2 Sheets—Sheet 1.
Patented Aug. 15, 1882.
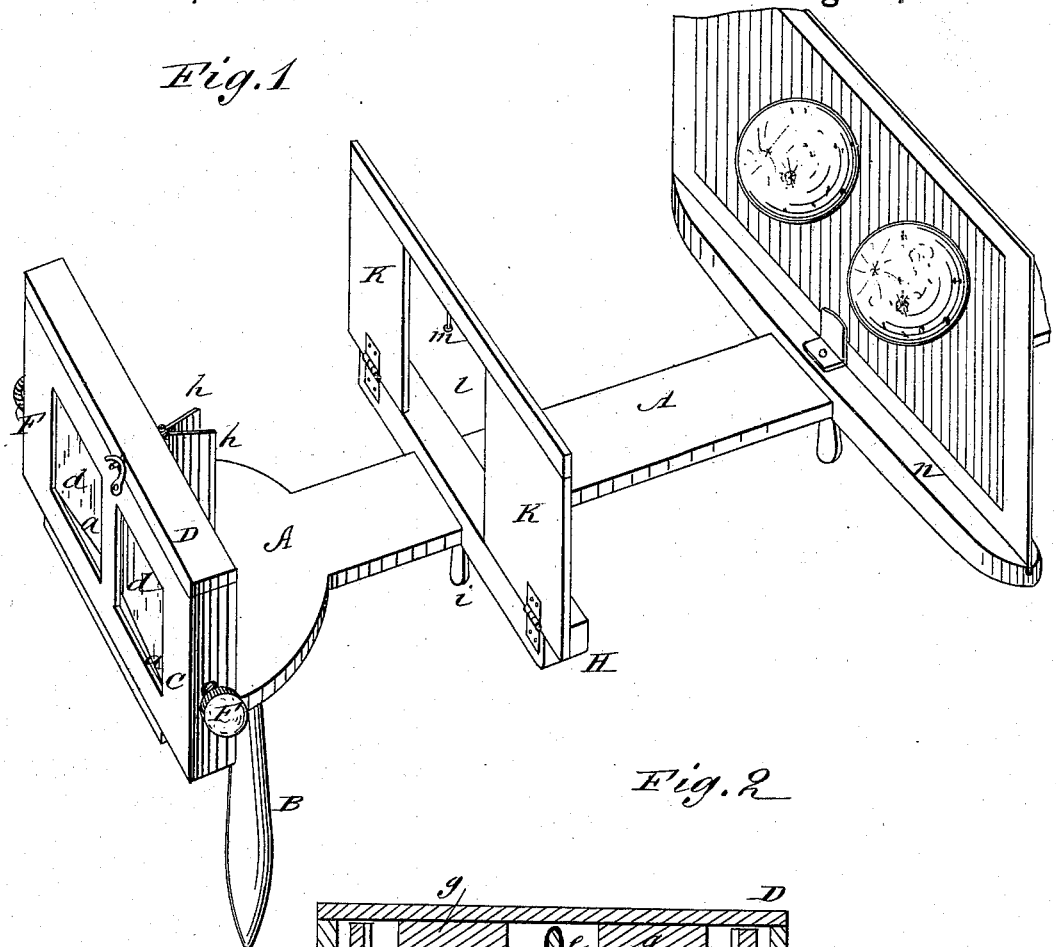
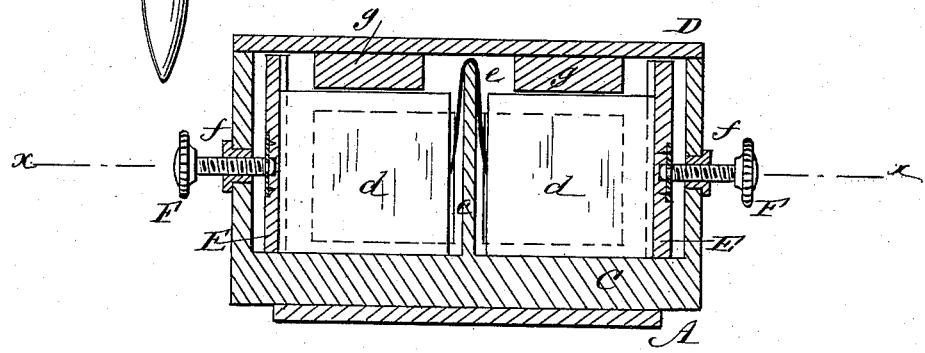
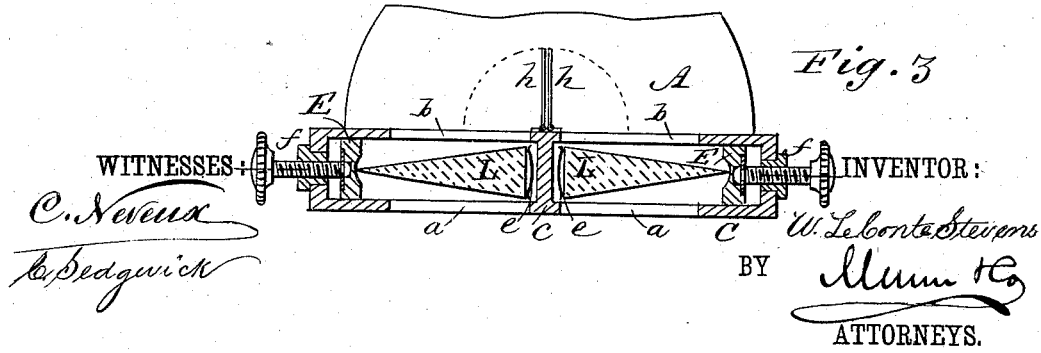
WITNESSES:
C. Neveux
E. Sedgwick
INVENTOR:
W. Le Conte Stevens
BY Munn & Co
ATTORNEYS.

(Model.) 2 Sheets—Sheet 2.
W. LE CONTE STEVENS.
STEREOSCOPE.
No. 262,846. Patented Aug. 15, 1882.
Fig. 4
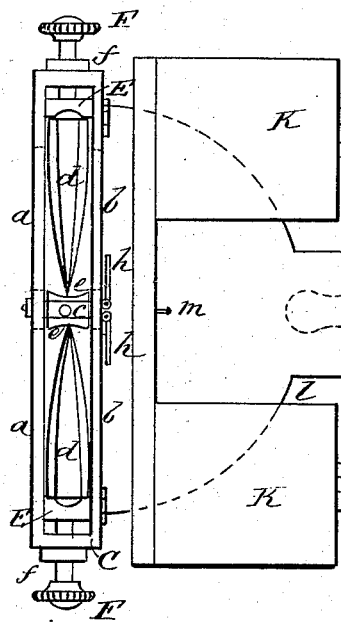
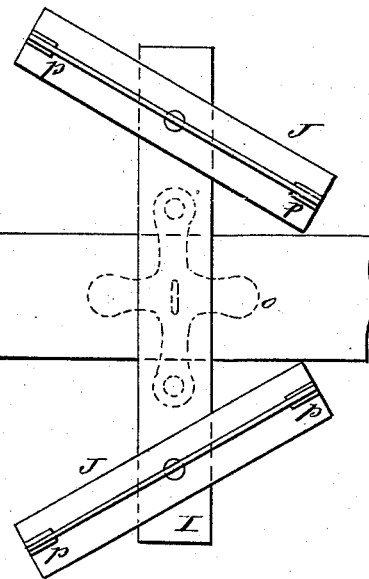
Fig. 5
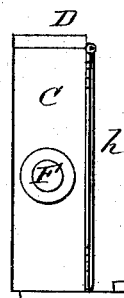
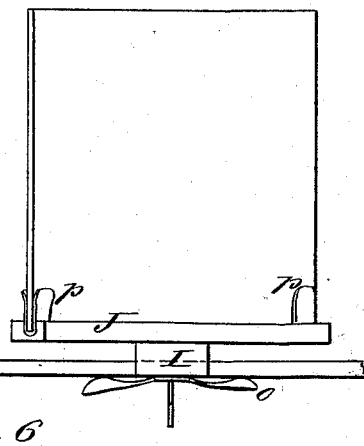
Fig. 6
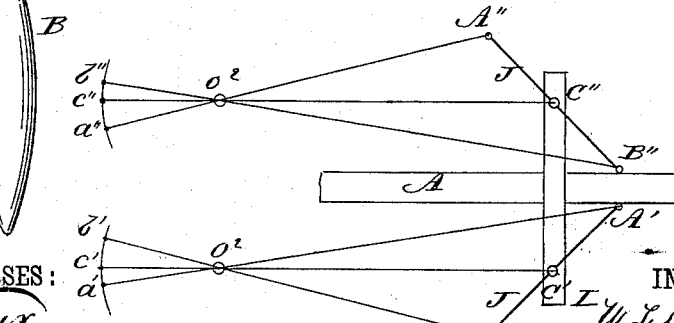
WITNESSES:
C. Neveux
Le Sedgwick
INVENTOR:
W. LeConte Stevens
BY Munn &Co
ATTORNEYS.

UNITED STATES PATENT OFFICE.

W. LE CONTE STEVENS, OF NEW YORK, N. Y.

STEREOSCOPE.

SPECIFICATION forming part of Letters Patent No. 262,846, dated August 15, 1882.

Application filed March 23, 1882. (Model.)

*To all whom it may concern:*

Be it known that I, W. LE CONTE STEVENS, of the city, county, and State of New York, have invented a new and Improved Adjustable Stereoscope, of which the following is a full, clear, and exact description.

The object of this invention is to make stereoscopic vision easier, and to obtain a single piece of apparatus with which the various peculiarities of binocular vision can be most conveniently illustrated.

The invention consists in an adjustment of the semi-lenses independently of each other, by which they may be adapted to any pair of eyes, whatever may be the distance between the pupils, and for any stereograph, whatever may be the distance, within ordinary limits, between corresponding points on the two pictures; also, in movable screens, by which, at pleasure, either eye may be permitted to view either the whole stereograph or its right half or its left half alone.

The invention also consists in a form of lens-cell which permits of the removal of the semi-lenses, so that they may be reversed in relative position or be replaced by prisms, which may be turned base to base or angle to angle.

The invention further consists in means of examining the binocular image, either alone or attended by its two monocular images, so that the difference between the visual results in binocular and monocular vision respectively may be contrasted; also, in means of producing stereoscopy in viewing a pair of perfectly similar pictures by so disposing these in position that the retinal images of them shall be dissimilar.

My improved instrument may be used either with glasses or for binocular combination of images by direct vision without them, and it will reduce the difficulty usually attendant upon stereoscopic vision by the latter method.

Reference is to be had to the accompanying drawings, forming part of this specification, in which similar letters of reference indicate corresponding parts in all the figures.

Figure 1 is a perspective view of my improved stereoscope. Fig. 2 is a vertical transverse section taken through the lens-cell. Fig. 3 is a horizontal section taken on the line $x$ $x$ in Fig. 2. Fig. 4 is a plan view. Fig. 5 is a side elevation; and Fig. 6 is a diagram showing the course of the light when two similar pictures are placed at an angle to each other, so as to be viewed obliquely.

The bar A, to which the various parts of the stereoscope are attached, is enlarged at one end, and is provided with a handle, B. The lens-cell C, consisting of a box having a cover, D, and openings $a$ $b$ in opposite sides, is attached to the upper side of the end of the bar A at right angles to it. A vertical transverse partition, $c$, divides the cell C into two equal and similar chambers, in each of which, in the present case, is placed a prism-lens, $d$, with its base outward. A V-shaped spring, $e$, reaches down upon each side of the partition $c$, nearly to the middle of the cell, and bears in opposite directions against the edges of the lenses $d$, tending to force the lenses apart. To hold the edges of the lenses centrally in the cell, the ends of the V-shaped spring $e$ are concaved.

In the lens-cell C there are two followers, E, one in each end, swiveled to the screws F, which turn in nuts $f$, inserted in the ends of the cell. By means of these screws F the lenses $d$ may be approached toward each other in opposition to the spring $e$. The cover D of the cell C is provided with two blocks, $g$, which confine the two lenses so that they move in the same plane.

Two pivoted screens, $h$, are attached to the back of the cell C, and may be folded together, as shown in Fig. 3; or they may be turned down in opposite directions flat against the back of the cell, so as to cover about one-half of each lens. A cross-bar, H, provided with the usual friction-spring, $i$, slides on the bar A, and carries two screens, K, which are hinged to it and capable of folding down on the bar A. Between the two screens there is an opening, $l$, into which the point $m$ projects centrally at the top of the opening.

An ordinary stereograph-holder, $n$, is also fitted to the bar A for holding stereographic or plain pictures. A cross-bar, I, is fitted to the bar A at right angles to it and parallel with the lens-cell C, and is provided with the ordinary spring, $o$, which bears against the under side of the bar A and retains the cross-bar I in any desired position along the length of the bar A.

To the upper surface of the cross-bar I, and near opposite ends, are pivoted the short bars J at the middle of their length, and capable of swinging in a plane parallel with the top of the cross-bar I. These bars J are grooved longitudinally, and provided with clips $p$ for holding pictures.

To adjust the instrument for natural perspective, the stereograph is placed on the cross-bar $n$, Fig. 1, and the wooden and metal screens $h$ and $k$ are pressed flat, and the semi-lenses $d$ rest in the lens-cell with their bases outward. On pulling the cross-bar $n$ until the stereograph is only six or seven inches distant from the eyes the picture will be seen in full relief with natural perspective.

In the use of ordinary stereoscopes, if the distance between corresponding points on the two pictures of the stereograph be greater than average, or the observer's eyes be farther apart than usual, binocular combination of the pictures is found impossible, or the muscles of the eyes are strained in retaining the divergence of visual lines that is necessary. This is corrected in my instrument by means of the adjusting-screws F. When the semi-lenses are pushed together as closely as possible binocular vision is retained by optic divergence, if the distance between corresponding points of the two pictures exceeds three and a half inches. When they are as far apart as possible optic convergence is produced in looking through the lenses at ordinary stereographs.

To adjust the instrument for reversed perspective, the semi-lenses are removed, and the plane-sided prisms L are substituted, with their bases inward, as shown in Fig. 3. The cross-bar holding the stereograph is pushed to the end of the bar A, and the screens K K are lifted, and the hinged screens $h$ are folded together, as in Fig. 3. On looking through the prisms the picture will be seen in reversed perspective. It may then be drawn up as near as convenient.

The reversion of perspective is only partial in pictures where ordinary mathematical perspective is strong. In some cases certain objects will appear transposed from rear to front. In others the only observable effect will be a foreshortening and diminution in size of the whole picture.

The plane-sided prisms may be used for viewing ordinary stereographs stereoscopically by placing their angles inward.

By discarding both semi-lenses and prisms the instrument becomes a direct-vision stereoscope, affording variations in perspective effect superior to those obtained with refracting glasses.

To secure natural perspective by direct vision, a stereograph is selected upon which the distance between corresponding points does not exceed two and three-fourths or three inches. It is placed on the cross-bar $n$ at the end of the stereoscope. The screens $h$ K are pressed down flat. By gazing with the muscles of the eyes perfectly relaxed, as if looking through the stereograph at a very distant object, the two pictures will become slightly dim and appear to glide slowly one over the other until they coalesce, and at the same moment spring into clear natural relief. The visual lines are then slightly divergent.

To adjust the instrument for stereoscopy of similar figures, the separate halves of a stereograph made up of two perfectly similar figures are placed in the clips on the bars J. By turning the cards at an angle, as shown in Figs. 4, 5, and 6, the projections of the pictures upon the curved surfaces within the two eyes are slightly dissimilar, and the binocular image appears with stereoscopic relief, which may be varied at will or completely reversed by varying the angle between the cards. Referring now to Fig. 6, these pictures, being oppositely inclined, are viewed obliquely by the eyes, whose optic centers are at $o^2\ o^2$. The retinal images are $a'\ c'\ b'$ and $a''\ c''\ b''$, respectively. Although $A'\ C' = C'\ B'$ and $A''\ C'' = C''\ B''$, necessarily $a'\ c' < c'\ b'$ and $a''\ c'' > c''\ b''$. Therefore the binocular combination of these dissimilar retinal images appears in stereoscopic relief with the convexity toward the observer. By reversing the inclination of the pivoted bars the apparent convexity is changed into concavity.

Having thus fully described my invention, what I claim as new, and desire to secure by Letters Patent, is—

1. In a stereoscope, a lens-cell consisting of a box divided into two compartments and provided with a hinged cover, substantially as herein shown and described, whereby lenses or prisms of different grades may be conveniently inserted and removed, as set forth.

2. In a stereoscope, a lens-cell consisting of a box having an adjusting-screw at each end, substantially as herein shown and described, whereby the lenses can be adjusted independently of each other, as set forth.

3. In a stereoscope, the cell C, spring $e$, screws F, and follower E, in combination, substantially as herein specified.

4. In a stereoscope, the combination of the hinged screens $h$ and lens-cell C, as herein specified.

5. In a stereoscope, the combination of the folding screens K, hinged screens $h$, and lens-cell C, as herein specified.

6. In a stereoscope, the folding screens K, hinged to the sliding cross-bar H, and provided with the central opening, $l$, between them, substantially as and for the purpose set forth.

7. In a stereoscope, the picture-holders J for supporting the two halves of a stereograph at an angle with the optical axes of the stereoscope, said angle being either greater or less than a right angle, substantially as specified.

8. In a stereoscope, the slide I and adjustable picture-holders J, in combination, substantially as shown and described.

9. In a stereoscope, the combination, with the folding and sliding screens K, provided with the central opening, $l$, of the two plane-sided prisms L, arranged with their bases inward, substantially as and for the purpose set forth.

W. LE CONTE STEVENS.

Witnesses:
 C. SEDGWICK,
 D. M. HOLDREDGE.